United States Patent [19]

Richardson

[11] Patent Number: 5,676,389
[45] Date of Patent: Oct. 14, 1997

[54] SLIDER SUSPENSION WITH MUD FLAP MOUNTING BRACKET ASSEMBLY

[75] Inventor: Gregory A. Richardson, Muskegon, Mich.

[73] Assignee: Nai Neway, Inc., Muskegon, Mich.

[21] Appl. No.: 727,026

[22] Filed: Oct. 8, 1996

Related U.S. Application Data

[63] Continuation of PCT/US95/17040 Dec. 29, 1995.

[51] Int. Cl.$^6$ .................. B62D 27/06; B62D 25/16
[52] U.S. Cl. .................. 280/149.2; 248/214; 280/154; 280/851
[58] Field of Search .................. 280/149.2, 848, 280/154, 851, 155, 157; 248/214

[56] References Cited

U.S. PATENT DOCUMENTS

| | | |
|---|---|---|
| 1,094,134 | 4/1914 | Dickerson . |
| 2,640,714 | 6/1953 | Garner et al. . |
| 2,652,266 | 9/1953 | Miller . |
| 2,683,612 | 7/1954 | Bacino . |
| 2,801,867 | 8/1957 | Childreth . |
| 2,860,453 | 11/1958 | Russell et al. . |
| 3,158,386 | 11/1964 | Tillinghast et al. . |
| 3,219,363 | 11/1965 | Dalsey et al. . |
| 3,224,791 | 12/1965 | Sogoian . |
| 3,388,884 | 6/1968 | Eggler et al. . |
| 3,632,137 | 1/1972 | Jossy . |
| 3,700,260 | 10/1972 | Moore et al. . |
| 3,746,366 | 7/1973 | Bruce et al. . |
| 3,778,086 | 12/1973 | Moore et al. . |
| 3,837,672 | 9/1974 | Molby . |
| 3,848,842 | 11/1974 | Jepsen . |
| 3,874,697 | 4/1975 | Thompson . |
| 3,877,722 | 4/1975 | Conner . |
| 4,007,944 | 2/1977 | Dingess . |
| 4,165,092 | 8/1979 | Herlein . |
| 4,273,347 | 6/1981 | Hulse .................. 280/149.2 |
| 4,326,727 | 4/1982 | Rock . |
| 4,635,742 | 1/1987 | Bertolini .................. 280/149.2 X |
| 4,726,599 | 2/1988 | Antekeier et al. . |
| 4,865,341 | 9/1989 | Hicks . |
| 5,080,397 | 1/1992 | Metcalf .................. 280/851 |

FOREIGN PATENT DOCUMENTS

| | | |
|---|---|---|
| 0 107 746 | 5/1984 | European Pat. Off. . |
| 0 194 806 | 9/1986 | European Pat. Off. . |

OTHER PUBLICATIONS

Betts Spring Company, Inc. brochure entitled "Off–Set Mud Flap Holders," (no date).
Betts Spring Company, Inc. brochure entitled "Shortened Mud Flap Holders," (no date).
Betts Spring Company, Inc. brochure entitled "Standard Mud Flap Holders," (no date).
Fleet Engineers brochure entitled "Shortie Brackets" pp.303–13– 303–16, (no date).
Fleet Engineers brochure entitled "Flap Brackets," pp. 303–309 –303–312, (no date).

*Primary Examiner*—Brian L. Johnson
*Assistant Examiner*—Michael Mar
*Attorney, Agent, or Firm*—Varnum, Riddering, Schmidt & Howlett LLP

[57] ABSTRACT

A mud flap bracket assembly (16) for a slider suspension has a forward portion (22) adapted to be fixedly secured to a shortened slider rail (14), and a rearward portion (28) adapted to be slidably mounted to a body rail (12). Mud flaps (30) are suspended from the rearward portion (28).

16 Claims, 3 Drawing Sheets

SLIDER SUSPENSION WITH MUD FLAP MOUNTING BRACKET ASSEMBLY

RELATED APPLICATIONS

This application is a continuation of International Application No. PCT/US95/17040, filed Dec. 29, 1995.

BACKGROUND OF THE INVENTION

1. Field of the Invention

This invention relates to slider suspensions for semitrailers, and, more particularly, to a mud flap mounting bracket for a slider suspension, and to slider suspensions incorporating such mud flap brackets.

2. Scope of the Prior Art

Slider suspensions are commonly used with semitrailers where it is desirable to adjust the distance between the trailer axles and the drive axles on a tractor to which a semitrailer is attached. Typically, the semitrailer includes a structural box-like container; but, unlike conventional trailers, there is no full-length frame supporting the container. Rather, rigidity is achieved through the construction of the container. For the suspension, a pair of body rails is mounted to the underside of a rear portion of the trailer. The trailer suspension itself is slidably mounted to the body rails for movement in a fore and aft direction.

The slider suspension includes a subframe with axles and wheels suspended therefrom usually by means of a pair of trailing arms. The subframe includes slider frame rails which are slidably inserted into the body rails. When the suspension is moved in the aft direction, the spacing between the trailer axles and the drive axles on the tractor is increased. Conversely, when the suspension is moved in the forward direction, the spacing is decreased. A common slider suspension of the type just described is disclosed in U.S. Pat. No. 5,088,763, issued Feb. 18, 1992.

Typically, in slider suspensions, mud flaps are suspended from mounting brackets to the slider frame rails at a fixed distance rearwardly from the tires. Each mud flap is spaced sufficiently behind the tire so as to minimize the likelihood of getting caught in the tire, yet close enough to the tire to deflect the greatest amount of debris cast off the tire as possible. Moreover, in the event that the mud flaps do get shorn from their mountings, as for example, when they are pinched between the tires and a fixed object such as a curb or parking block, the mounting brackets must be strong enough to avoid deformation. Since the mud flaps are suspended from the slider frame rails, it is evident that slider frame rails must extend rearwardly of the tires to accommodate the optimum fixed distance. An alternative mounting for the mud flaps would eliminate the necessity of the extended slide frame rails and, thus, significantly reduce the weight of the suspension. However, any alternative mounting must be strong enough to withstand a mud flap being torn off without deformation.

SUMMARY OF THE INVENTION

The invention is a slider suspension incorporating a novel mud flap bracket. The slider suspension comprises a pair of parallel body rails on which is supported a container. A pair of slider frame rails to which is mounted an axle and wheel assembly are slidably mounted to the body rails for longitudinal movement with respect to the body rails. The longitudinal position of the wheels with respect to the container can be altered by longitudinally moving the slider frame rails with respect to the body rails. A mud flap bracket assembly is mounted behind the axle of the wheel assembly. The improvement in the slider suspension comprises the mud flap bracket assembly having an extension beam with a forward portion fixedly mounted to the slider frame rails and a rearward portion extending rearwardly of the forward portion and slidably mounted to the body rails. The rearward portion has a mounting bracket for suspending a mud flap a predetermined distance of at least one wheel.

In one aspect of the invention, the mud flap bracket assembly comprises a cross member to which the mud flap is mounted. The mud flap bracket assembly further has a second extension beam laterally spaced from the first-mentioned extension beam. The rearward portion of the first and second extension beams are joined by the cross member.

Preferably, the mud flap bracket assembly has a hanging bracket that is fixedly mounted to the extension beam and slidably mounted to the body rail. The hanging bracket has an arcuate bracket lip and the body rail has an arcuate rail lip. The rail lip is slidably received within a channel of the bracket lip to slidably mount the mud flap bracket assembly to the body rail. The arcuate bracket lip defines a recess, and the hanging bracket has a plate that partially covers the recess to define a slot in which the body rail lip is received.

In another aspect, the improvement in the slider suspension comprises the suspension being mounted to one of the slider frame rails so that the end of the slider frame rail length that is shorter than the periphery of the at least one wheel, and a mud flap bracket assembly fixedly mounted to one of the slider frame rails to move with the rails and adapted to mount to the mud flap a predetermined distance behind the at least one wheel regardless of the position of the slider frame rails with respect to the body rails.

BRIEF DESCRIPTION OF THE DRAWINGS

The invention will now be described with reference to the following drawings in which:

FIG. 3 is an elevational view of the mud flap assembly of FIG. 1 with the slider suspension removed.

DETAILED DESCRIPTION OF THE PREFERRED EMBODIMENT

Figure 1:
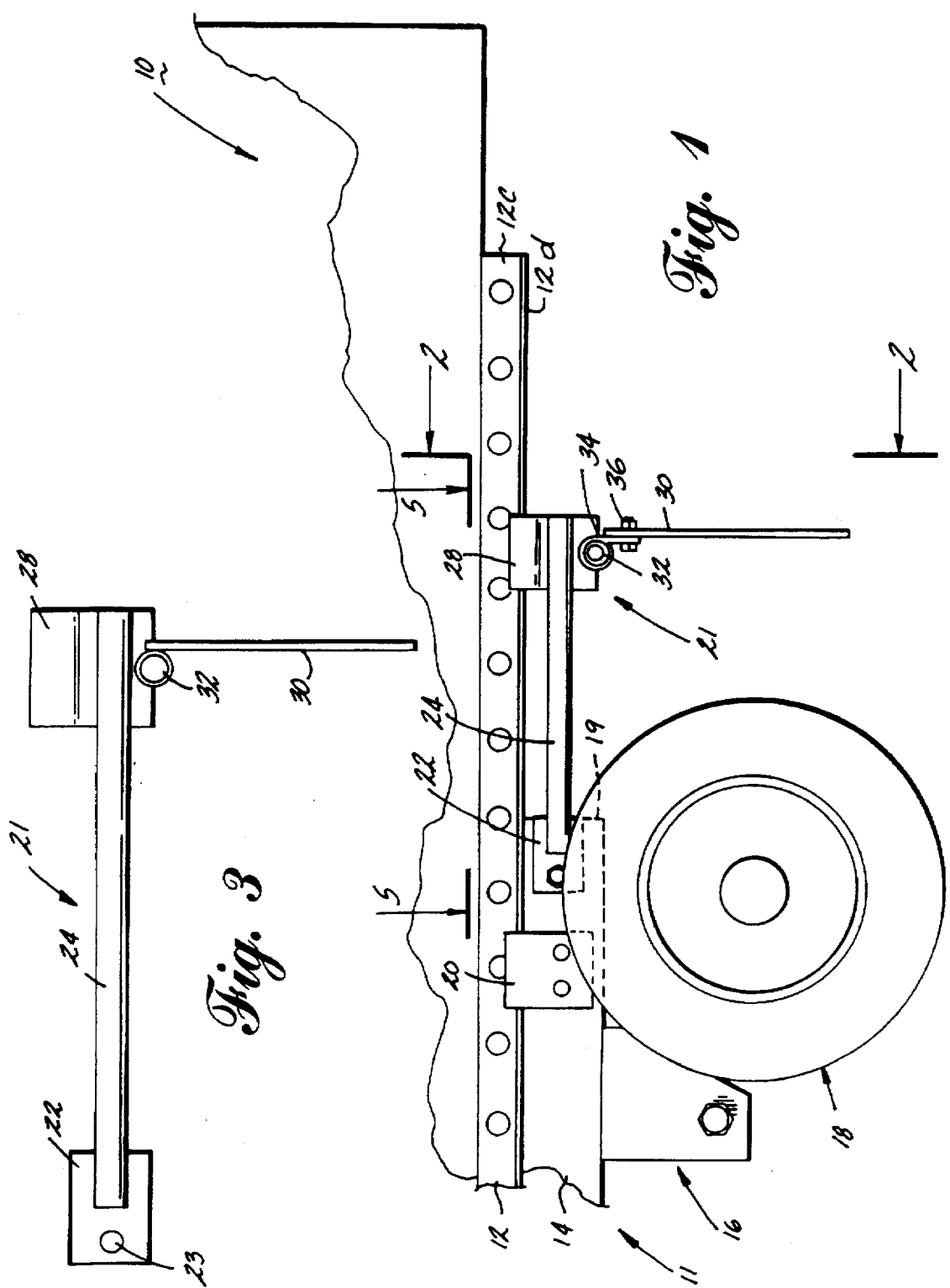
FIG. 1 is a partial elevational view of a slider suspension and mud flap bracket according to the invention.

The invention can be seen in the improved slider suspension 11 illustrated in FIG. 1. A detailed description of the pertinent elements of a slider suspension similar to that of FIG. 1 is found in U.S. Pat. No. 5,088,763, issued Feb. 18, 1992, which is incorporated herein by reference.

The slider suspension 11 is designed to mount to the underside of a box-like semitrailer 10. Although only one side of the slider suspension 11 is shown in FIG. 1 and described herein for simplicity, it will be understood that the opposite side of the trailer container 10 has a similar suspension arrangement.

Figure 2:
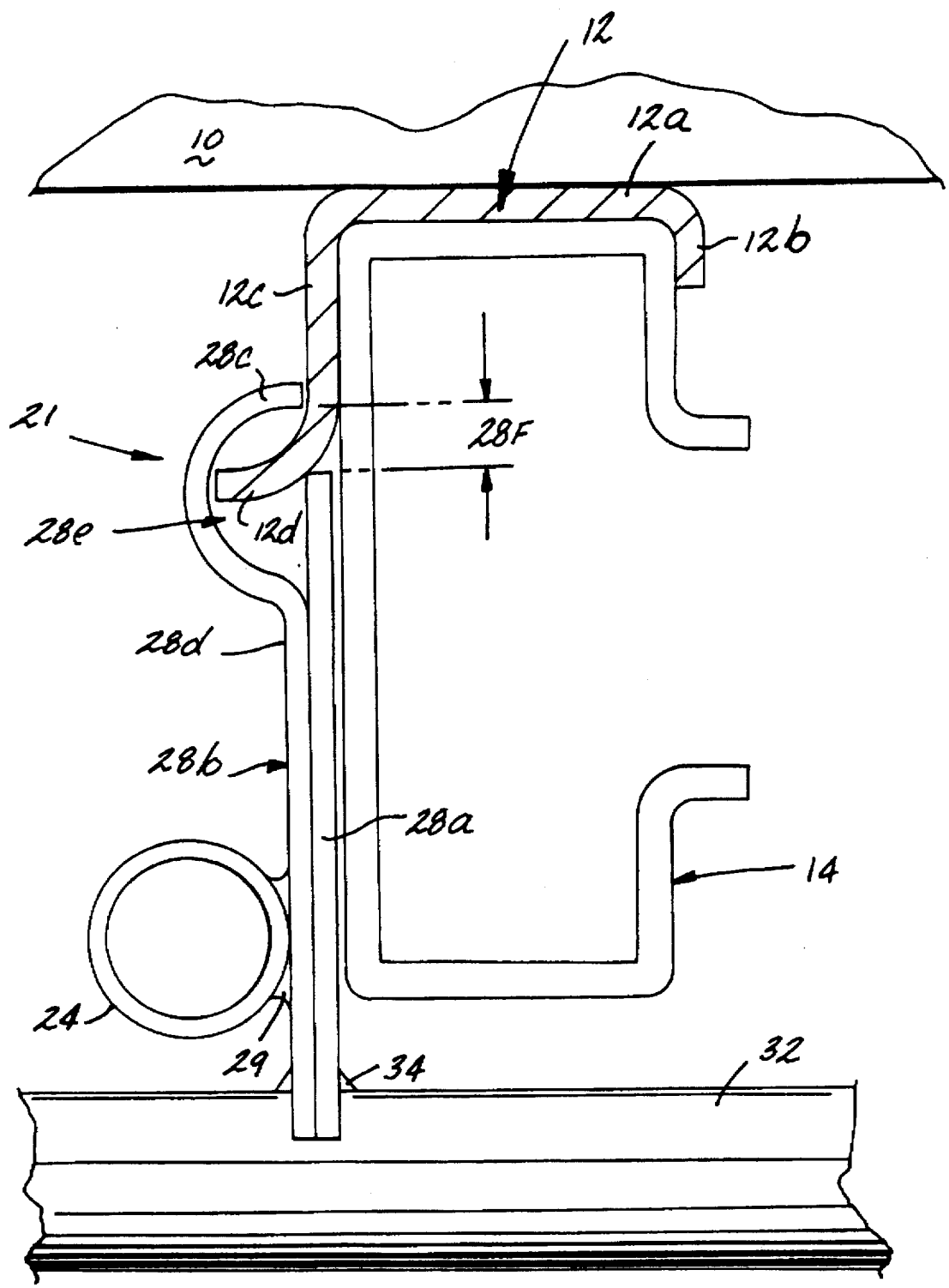
FIG. 2 is an enlarged partial rear view of a slider suspension taken along lines 2—2 of FIG. 1 with a portion of the slider suspension removed for clarity.

Referring now to FIGS. 1 and 2, the slider suspension 11 includes a body rail 12 mounted to the underside of the trailer container 10. A slider frame rail 14 is slidably mounted within the body rail 12. A trailing arm bracket assembly 16 is mounted to the underside of the slider frame rail 14 and supports a wheel 18 in a manner well known in the art. The body rail 12 comprises a top wall 12a fixedly secured to the container 10, an interior flange 12b and an exterior flange 12c. The interior flange 12b and the exterior flange 12c extend vertically downward from the top wall 12a. Exterior flange 12c is slightly longer than interior flange 12b and includes an outwardly protruding lip 12d. A slider clip 20 is mounted to the slider frame rail 14 and includes an upper lip (not shown) that mounts onto a protruding lip 12d of the body rail 12 to permit the slider frame rail 14 to slidably mount the body rail 12. It will be appreciated that the rearward end 19 of the frame rail 14 terminates just rearwardly of the bracket assembly 16, not far enough to support a mud flap in the conventional manner.

Referring now more closely to FIGS. 2 and 3, a mud flap assembly 21 is shown without the slider suspension elements for clarity. The mud flap assembly 21 comprises a rectangular attachment plate 22 having a bore 23 at a forward end thereof and the proximal end of a tubular extension beam 24 welded to a rearward end thereof. A bracket support clip 28 is secured to the distal end of the extension beam 24 by weldments 29.

The bracket support clip 28 comprises an interior member 28a and an exterior member 28b. The exterior member 28b is hook-shaped in cross section and comprises an arcuate portion 28c extending from a lower planar portion 28d thereof. The interior member 28a is a rectangular plate that abuts the lower planar portion of the exterior member 28b and is welded thereto. The upper end of the interior member 28a extends beyond the planar portion of exterior member 28b to define a channel 28e. A gap 28f remains between the upper end of exterior member 28b and the upper edge of interior member 28a.

Figure 4:
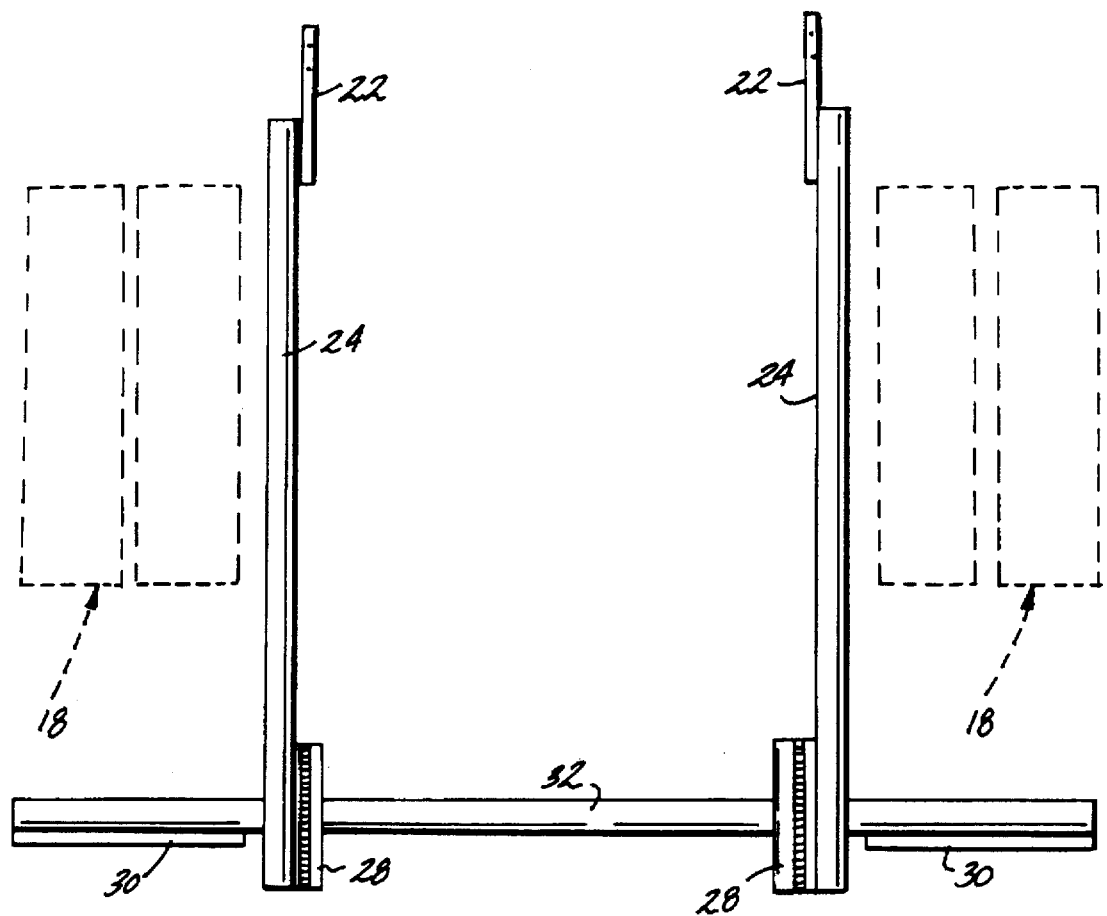
FIG. 4 is a top view taken along lines 5—5 of FIG. 1 of the mud flap bracket with portions of the slider suspension removed.

Referring now also to FIG. 4, a cross beam 32 extends between and beyond and is affixed to the bracket support clips 28 on either side of the trailer 10 preferably by welding. Mud flaps 30 are suspended from the cross beam 32 and mounted thereto by any manner well known in the art. For example, returning again to FIG. 1, the mud flaps 30 can be mounted to the cross beam 32 through several hinges 34 which wrap around the cross beam and bolts 36 which bolt the mud flaps 30 to the cross beam 32 in a manner disclosed in U.S. Pat. No. 2,640,714. It will be understood that the means for securing the mud flaps 30 to the cross beam 32 are not critical to the invention.

Referring again to FIGS. 1 and 2, the attachment plate 22 is securely fastened to the slider frame rail 14 near its end 19 by a conventional bolt and nut fastener via the bore 23 or by welding. The mud flap assembly extends rearwardly of the slider frame rail 14. Also, the channel 28e in the bracket support clip 28 receives the protruding lip 12d on the body rail 12 so that the mud flap assembly 21 is slidably suspended from body rails 12 and is movable with the slider frame rail 14. Preferably, the extension beam 24 is of sufficient length so the mud flap 30 is located an optimal fixed distance from wheel 18.

The slider suspension with mud flap bracket assembly according to the invention provides significant advantages over conventional mud flap attachment assemblies. First, the mud flap assembly 21 according to the invention provides substantial material and weight savings because the slider frame rail 14 need only extend to a point where the trailing arm suspension 16 is mounted. Second, because the mud flap assembly 21 is suspended from the body rails 12 and attached to the slider frame rails 14, the mud flap assembly 21 will slide together with the slider frame rail 14 along the channel 13 defined by the body rails 12. Thus, the mud flap 30 may be fixed at an optimum distance from the wheel 18 regardless of the position of the slider relative to the container. Third, the weight of the mud flap bracket assembly is borne by the body rails, thus providing secure stability to the structure and minimizing the chance for deformation upon inadvertent removal of the mud flaps.

It will be understood that reasonable variation and modification of the foregoing embodiments according to the invention, are possible within the scope of the foregoing disclosure and drawings without departing from the spirit of the invention as defined in the appended claims.

I claim:

1. In a slider suspension comprising a pair of body rails for supporting a container, a pair of slider frame rails slidably mounted to the body rails for longitudinal movement relative thereto, and an axle and wheel assembly mounted to the slider frame rails, whereby the longitudinal position of the axle and wheel assembly with respect to the body rails can be altered by longitudinal movement of the slider frame rails with respect to the body rails, the improvement comprising;

a mud flap bracket assembly for attachment to the slider suspension, the mud flap bracket assembly extending behind the axle and wheel assembly, the mud flap bracket assembly having an extension beam with a forward portion adapted to be fixedly mounted to one of the slider frame rails and a rearward portion extending rearwardly of the forward portion and an attachment member secured to at least a rearward portion of the extension beam, the attachment member being slidably mounted to one of the body rails, the rearward portion having a mounting bracket for suspending a mud flap a predetermined distance aft of at least one wheel of the axle and wheel assembly.

2. An improved slider suspension according to claim 1 wherein the mud flap bracket assembly further comprises a cross member to which a mud flap is mounted.

3. An improved slider suspension according to claim 2 wherein the mud flap bracket assembly further comprises a second extension beam laterally spaced from the first-mentioned extension beam, the second extension beam having a forward portion fixedly mounted to the other of the slider frame rails and a rearward portion extending rearwardly of the forward portion and slidably mounted to the other of the body rails, the rearward portions of the first-mentioned and second extension beams being joined by the cross member.

4. An improved slider suspension according to claim 3 wherein at least two mud flaps are mounted to the cross member.

5. An improved slider suspension according to claim 1 wherein the mud flap bracket assembly further comprises a hanging bracket fixedly mounted to the one extension beam and slidably mounted to the one body rail.

6. An improved slider suspension according to claim 5 wherein the hanging bracket has an arcuate bracket lip and the one body rail has an arcuate rail lip, and the bracket lip overlies and abuts the rail lip to slidably mount the mud flap bracket assembly to the one body rail.

7. An improved slider suspension according to claim 6 wherein the arcuate bracket lip defines a recess and the hanging bracket further comprises a plate that partially covers the recess to define a slot in which the body rail lip is received.

8. An improved slider suspension comprising a pair of body rails adapted to support a container, a pair of slider frame rails slidably mounted to the pair of body rails for longitudinal movement relative thereto, and a suspension mounted to the slider frame rails and having opposing wheels such that sliding the slider frame rails with respect to the body rails will alter the longitudinal position of the wheels with respect to the body rails, and at least one mud flap disposed behind at least one of the wheels;

the suspension being mounted to one of the slider frame rails so that at least a portion of an outer periphery of the at least one wheel extends rearwardly of a rearward end of the one slider flame rail; and a mud flap bracket assembly having a support member adapted to be fixedly mounted to one of the slider frame rails, the support member having a portion extending away from the rearward end of the one slider frame rail and an attachment member associated with the support member and slidably mounted to one of the body rails, such that the bracket assembly moves with the slider frame rails and is adapted to mount the mud flap a predetermined distance rearwardly of the at least one wheel, regardless of the position of the slider rails with respect to the body rails.

9. An improved mud flap bracket assembly adapted to be mounted to a slider suspension having a pair of body rails for supporting a container, a pair of slider frame rails slidably mounted to the pair of body rails for longitudinal movement relative thereto, and a suspension mounted to the slider frame rails and having opposing wheels such that sliding the slider frame rails with respect to the body rails will alter the longitudinal position of the wheels with respect to the container, the mud flap bracket assembly comprising:

an elongated support member:

a first fixed mount adapted to fixedly attach the elongated support member to one of the slider frame rails, the mud flap bracket assembly adapted to extend behind at least one of the wheels;

a first sliding mount associated with the support member and spaced a predetermined distance rearwardly from the fixed mount and adapted to slidably attach the elongated support member to one of the body rails; and a mud flap secured to the first sliding mount.

10. The improved mud flap bracket assembly according to claim 9 wherein the elongate support member comprises a first extension beam with opposite first and second ends, the first end forming the first fixed mount and the second end forming the first sliding mount.

11. The improved mud flap bracket assembly according to claim 10 further comprising a cross member mounted to the first extension beam, and a mud flap mounted to the cross member.

12. The improved mud flap bracket assembly according to claim 11 further comprising a second fixed mount, a second sliding mount and a second extension beam with opposite first and second ends, the first end of the second extension beam forming the second fixed mount, the second end of the second extension beam forming the second sliding mount, and the second fixed mount being fixedly mounted to the other slider frame rail and the second sliding mount being slidably mounted to the other body rail.

13. The improved mud flap bracket assembly according to claim 12 wherein the cross member is mounted to both the first and second extension beams.

14. The improved mud flap bracket assembly according to claim 13 wherein at least two mud flaps are mounted to the cross member.

15. The improved mud flap bracket assembly according to claim 9 wherein the sliding mount has an arcuate groove to define a bracket lip.

16. The improved mud flap bracket assembly according to claim 15 wherein the sliding mount further comprises a plate that partially covers the arcuate groove to define a slot adapted to receive a lip extending from the body rail.

* * * * *